Sept. 5, 1961  C. L. EDWARDS  2,998,670
FISHHOOK EXTRACTOR
Filed Nov. 30, 1960

INVENTOR

Cyrus L. Edwards

2,998,670
FISHHOOK EXTRACTOR
Cyrus L. Edwards, Box 501, Angleton, Tex.
Filed Nov. 30, 1960, Ser. No. 72,677
1 Claim. (Cl. 43—53.5)

The present invention relates to an extractor for removing fishhooks from the mouth and throat of fishes.

An object of the present invention is to provide a fishhook extractor adapted for extracting a fishhook from the mouth of a fish without handling of the fish by the fisherman any more than necessary and, without endangering excessively the life of the fish.

Another object of the present invention is to provide a fishhok extractor which is highly efficient in operation, one which is reasonable in price to manufacture, and one which lends itself to manufacture in such material as to provide it with long life characteristics.

These and other objects will become apparent from the following description when taken in connection with the annexed drawing, in which.

Figure 1:
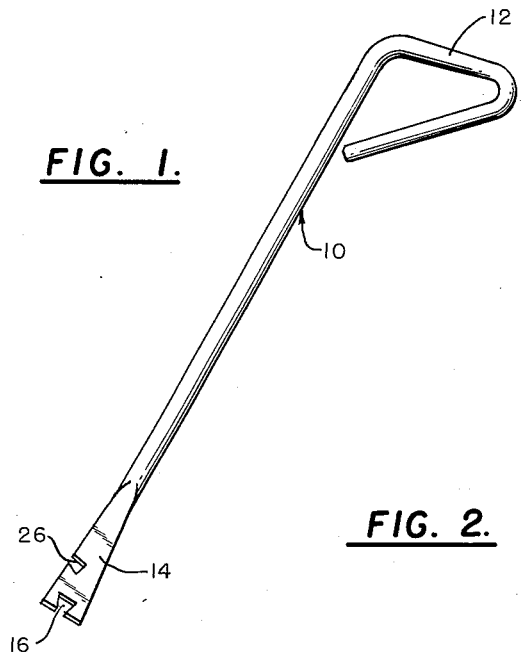
FIGURE 1 is a perspective view of the extractor of the present invention.
Figure 2:
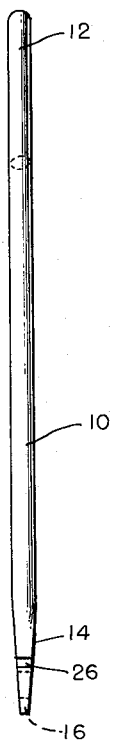
FIGURE 2 is a side elevational view.
Figure 3:
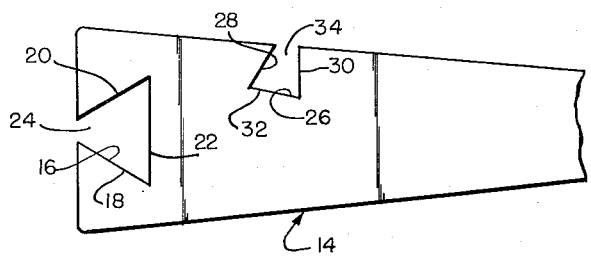
FIGURE 3 is an enlarged view of the blade of the extractor, showing the proportional sizes of the blade notches.

With reference to the drawing in detail, the fishhook extractor of the present invention comprises an elongated shank 10 having a handle 12 on one end and a blade 14 projecting longitudinally from the other end of the shank 10.

The blade 14 tapers in width from the free end of the blade to the point of juncture with the shank 10 and also in thickness from the point of juncture with the shank 10 to the free end of the blade 14.

The blade 14 is provided in the free end with a notch 16 having side walls 18 and 20, and a bottom 22. The gap 24 of the notch 16 is of a width equal to or substantially equal to one-third of the length of each of the walls 18 and 20 or the length of the bottom 22.

The mid-portion of the blade 14 is provided on one side edge with another notch 26 having side walls 28 and 30 and a bottom 32.

The gap 34 of the notch 26 is of a length substantially equal to or equal to one-half of the length of each of the walls 28 and 30, or one-half of the length of the bottom 32.

The bottom 22 of the notch 16 and the wall 30 of the notch 26 are parallel to each other and parallel to the free end of the blade 14.

The wall 28 of the notch 26 slopes at an acute angle with respect to the free end of the blade 14 and the bottom 32 slopes at another angle with respect to the free end of the blade 14.

In use the extractor of the present invention enables a fisherman to probe deeply within the throat and mouth of a fish until the extractor engages a hook which has been swallowed and caught in the flesh of a fish.

The slot in either the free end of the blade or in the side edge of the blade may be engaged with the hook within the flesh of the fish and, with practice, the fisherman, using the extractor of the present invention can rotate the hook when engaged in either of the notches 16 or 26 and enable the fisherman to free the hook from the flesh and remove the same through the mouth of the fish.

The handle 12 within the side of the shank 10 opposite the notch 26, as shown in FIGURE 1, enables the fisherman to handle the extractor with efficiency and with a minimum waste of time, without damage to the hook and leader swallowed by the fish, and in most cases without further injury to the fish.

It is intended that the extractor of the present invention may be manufactured from material which may be rustproof, and of such strength and rigidity as to be equal to the task without bending.

Further, it is intended that the extractor of the present invention may be manufactured in such sizes as to accommodate hooks of various sizes and other changes and modifications may be made in the extractor without departing from the spirit of the invention as set forth in the appended claim.

What is claimed is:

A fishhook extractor comprising an elongated shank, a handle on one end of said shank, and a blade projecting longitudinally from the other end of said shank, said blade tapering in width from the free end to the point of juncture with said shank and in thickness from the point of juncture with said shank to the free end thereof, said blade being provided in the free end with a notch having straight walls diverging from the free end of said blade to the bottom of said notch, said notch bottom being straight and parallel to the free end of said blade.

References Cited in the file of this patent
UNITED STATES PATENTS

| 1,246,710 | Brunson | Nov. 13, 1917 |
| 2,578,289 | Danielson | Dec. 11, 1951 |

FOREIGN PATENTS

| 252,300 | Italy | Mar. 9, 1927 |
| 648,335 | France | Aug. 13, 1928 |